J. ROBINSON.
Horseshoe-Weight.

No. 213,939. Patented April 1, 1879.

WITNESSES
Robert Everett
H. Clay Smith

INVENTOR
John Robinson
By Chipman, Hosmer & Co.
ATTORNEYS.

UNITED STATES PATENT OFFICE.

JOHN ROBINSON, OF OTTUMWA, IOWA.

IMPROVEMENT IN HORSESHOE-WEIGHTS.

Specification forming part of Letters Patent No. 213,939, dated April 1, 1879; application filed October 26, 1878.

*To all whom it may concern:*

Be it known that I, JOHN ROBINSON, of Ottumwa, in the county of Wapello and State of Iowa, have invented certain new and useful Improvements in Horseshoe-Weights; and I do hereby certify that the following is a full, clear, and exact description of the same, reference being had to the accompanying drawings, in which—

Figure 1:
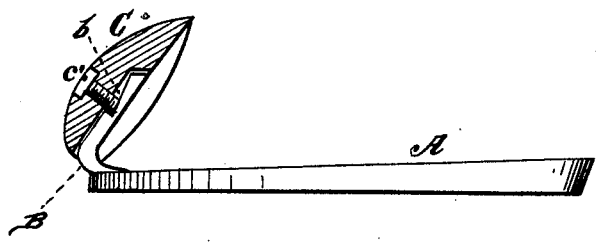
Figure 2:
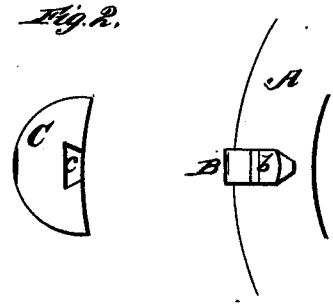

Figure 1 is a side elevation, partly in section; and Fig. 2, a detail view.

My invention relates to a weight for horses' feet, adapted to be removably attached to the horseshoe at any desired point; and the novelty consists in the construction and arrangement of parts, as will be more fully hereinafter set forth, and pointed out in the claim.

In carrying out my invention, I employ a removable weight having a dovetail socket adapted to receive a correspondingly-formed shank, which may be welded to the shoe at any desired point, or be secured thereto by male and female screw-threads. The weight is provided with a set-screw, which operates upon an inwardly-decreasing incline, which prevents its displacement.

Referring to the drawings, A represents the shoe, and B the shank or standard. It will be understood that the conformation is such as to adapt the different parts to the hoof of a horse.

C represents the weight, which is provided with a dovetail groove, $c$, adapted to receive the shank B, and with a set-screw, $c'$, which operates upon an inwardly-decreasing incline, $b$, upon the shank.

The shank B, secured to the shoe, for receiving the dovetailed toe-weight, is nearly in the form of the triangular portion of the figure 4, except that it is provided with an inwardly-inclined recess, $b$, which receives the point of the set-screw $c'$, and prevents the toe-weight from sliding upward upon the shank.

I am aware that a toe-weight for a horseshoe composed of a removable weight having a dovetailed recess to receive a tongue upon a shank, and secured to the same in various ways, is old. I do not, therefore, seek to cover such a construction in this application.

What I claim as my invention, and desire to secure by Letters Patent of the United States, is—

The weight C, having dovetail $c$ and set-screw $c'$, in combination with the shank B, having the incline $b$, and with the shoe A, as shown, for the purpose set forth.

JOHN ROBINSON.

In presence of—
RUFUS C. PORTON,
GEO. GRISWOLD.